(12) United States Patent
Xu et al.

(10) Patent No.: US 12,259,313 B1
(45) Date of Patent: Mar. 25, 2025

(54) RAPID AND COMPREHENSIVE METHOD FOR EVALUATING PITTING RESISTANCE OF STAINLESS STEEL PIPE WELDS

(71) Applicant: Tianjin University, Tianjin (CN)

(72) Inventors: Lianyong Xu, Tianjin (CN); Yongdian Han, Tianjin (CN); Yongle Shi, Tianjin (CN); Lei Zhao, Tianjin (CN); Kangda Hao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/824,852

(22) Filed: Sep. 4, 2024

(30) Foreign Application Priority Data

Dec. 22, 2023 (CN) .......................... 202311785131.0

(51) Int. Cl.
*G01N 17/02* (2006.01)
*G01N 1/32* (2006.01)
*G01N 17/00* (2006.01)

(52) U.S. Cl.
CPC ............... *G01N 17/02* (2013.01); *G01N 1/32* (2013.01); *G01N 17/006* (2013.01)

(58) Field of Classification Search
None
See application file for complete search history.

*Primary Examiner* — J. Christopher Ball
(74) *Attorney, Agent, or Firm* — JCIPRNET

(57) ABSTRACT

The disclosure relates to a rapid and comprehensive method for evaluating pitting resistance of stainless steel pipe welds. Weld samples are collected from different positions of one or more welds on the stainless steel pipe to obtain the surface oxide inclusion density and critical pitting temperature of each weld sample, the surface oxidation inclusion density is taken as an independent variable and the critical pitting temperature is taken as a dependent variable to obtain a fitting function formula between the surface oxidation inclusion density and the critical pitting temperature. The surface oxide inclusion density obtained by adopting the same welding process on the stainless steel pipe to be tested is substituted into the fitting function formula to obtain a standard critical pitting temperature of the weld to be tested. The pitting resistance of the weld of the stainless steel pipe to be tested can be evaluated rapidly, accurately, and comprehensively.

10 Claims, 3 Drawing Sheets

RAPID AND COMPREHENSIVE METHOD FOR EVALUATING PITTING RESISTANCE OF STAINLESS STEEL PIPE WELDS

CROSS-REFERENCE TO RELATED APPLICATION

This application claims the priority benefit of China application serial no. 202311785131.0, filed on Dec. 22, 2023. The entirety of the above-mentioned patent application is hereby incorporated by reference herein and made a part of this specification.

BACKGROUND

Technical Field

The disclosure belongs to the technical field of metallic performance testing, and more specifically, relates to a rapid and comprehensive method for evaluating pitting resistance of stainless steel pipe welds.

Description of Related Art

AISI 316L stainless steel has good corrosion resistance and is widely used in the marine industry. The added Cr can form Fe/Cr oxides on the steel surface, which is beneficial to improve the stability of the passivation film. Gas metal arc welding (GMAW) is commonly used for 316L pipe steel lining welding. Although GMAW is very efficient, welding defects in the lining weld metal often lead to reduced pitting performance of the weld. The international constant potential critical pitting temperature determination standard (GB/T 32550-2016 critical pitting temperature determination standard for corrosion of metals and alloys under constant potential control) requires that the surface area of the sample to be tested to be 1 cm², the sample size generally used is 10×10×B mm (B is the sample thickness). In the process of GMAW welding of austenitic stainless steel pipes, during the welding process, due to, for example, unqualified welding technology, inadequate weld protection, and incomplete slag removal after welding, the risk of occurring pitting corrosion of austenitic stainless steel welds is greatly increased, which affects the pitting resistance of the austenitic stainless steel welds. In the actual service of austenitic stainless steel, the local pitting rate of welds with lower critical pitting temperature is faster, causing the local pitting to rapidly expand into the weld, thereby the overall weld failure is caused.

Therefore, there is an urgent need for a rapid and comprehensive method for evaluating pitting resistance of stainless steel pipe welds, which is helpful to accurately and comprehensively evaluate the overall pitting resistance of the weld and is of great value for accurately predicting the service life of austenitic stainless steel used as marine industrial oil and gas pipes.

SUMMARY

In view of the defects of the related art, the purpose of the disclosure is to provide a rapid and comprehensive method for evaluating pitting resistance of stainless steel pipe welds, so as to solve problems, for example, the accuracy and reliability of the existing technology for evaluations of pitting resistance of stainless steel pipe welds need to be improved, the experimental cost of evaluating the effects of different welding processes or different heat input welding methods on the pitting resistance of stainless steel pipe welds is high, and there is a lack of accurate prediction of the service life of stainless steel pipes, particularly the service life of the pipes used as marine industrial oil and gas pipes.

To achieve the above purpose, the disclosure provides a rapid and comprehensive method for evaluating pitting resistance of stainless steel pipe welds, including the following steps:

S1. Multiple weld samples are collected from different positions of one or more welds on the stainless steel pipe, in which the sampling points of the multiple weld samples at least cover the root to the upper part of any weld, and the quantity of oxide inclusions per unit area in each weld sample is obtained, that is, the surface oxide inclusion density.

S2. The critical pitting temperature of each weld sample is obtained through a critical pitting temperature test.

S3. The surface oxidation inclusion density of each weld sample is taken as the independent variable, the critical pitting temperature of each weld sample is taken as the dependent variable, and the fitting function formula between the surface oxidation inclusion density and the critical pitting temperature is obtained as follows:

$$y=f(x)$$

In the formula, y is the critical pitting temperature, x is the surface oxide inclusion density, and f is the fitting function.

S4. A weld sample to be tested is collected from the stainless steel pipe to be tested, in which the welding process of the weld sample to be tested is the same as the weld sample, and the quantity of oxide inclusions per unit area in the weld sample to be tested is obtained, that is, the surface oxide inclusion density.

S5. The surface oxide inclusion density of the weld sample to be tested is substituted into the fitting function formula to obtain the standard critical pitting temperature of the weld sample to be tested, and the pitting resistance of the weld of the stainless steel pipe to be tested can be rapidly and comprehensively evaluated.

Preferably, in Step S1, the stainless steel includes any one of austenitic stainless steel, ferritic stainless steel, martensitic stainless steel, duplex stainless steel, and age-hardening stainless steel.

Preferably, in Step S1, the quantity of the plurality of weld samples is ≥5.

Further preferably, in Step S1, the quantity of the plurality of weld samples is ≥8.

Preferably, in Step S1, the size of the weld sample is 10×10×B mm, in which B≥5.

Further preferably, in Step S1, the size of the weld sample is 10×10×B mm, in which B is 8 to 15.

Preferably, in Step S1, before obtaining the quantity of oxide inclusions per unit area in each weld sample, electrolytic polishing is performed first.

Preferably, in Step S2, the critical pitting temperature test is a constant potential critical pitting temperature test.

Further preferably, before the constant potential critical pitting temperature test is performed, the weld sample is pretreated first; the pretreatment includes the following steps:

The weld sample is sanded and immersed in an acetone solution, then rinsed with an alcohol solution and dried.

Preferably, in Step S3, the analysis includes any one of linear regression analysis and polynomial regression analysis.

Preferably, in Step S3, the fitting function formula is as follows:

$$y=ax^2+bx+c$$

In the formula, y is the critical pitting temperature, x is the surface oxide inclusion density, and a, b, and c are fitting parameters.

In general, the above technical solution conceived by the disclosure has the following beneficial effects compared with the related art:

(1) The disclosure provides a rapid and comprehensive method for evaluating pitting resistance of stainless steel pipe welds, by collecting multiple weld samples from different positions of one or more welds on the stainless steel pipe, and the sampling points of the multiple weld samples at least cover the root to the upper part of any weld, the quantity of oxide inclusions per unit area in each weld sample is obtained, that is, the surface oxide inclusion density; through the critical pitting temperature test, the critical pitting temperature of each weld sample is obtained, and then the surface oxidation inclusion density of each weld sample is taken as the independent variable and the critical pitting temperature of each weld sample is taken as the dependent variable to obtain the fitting function formula between the surface oxidation inclusion density and the critical pitting temperature. The surface oxide inclusion density of the weld to be tested obtained by adopting the same welding process on the stainless steel pipe to be tested is substituted into the fitting function formula, and the standard critical pitting temperature of the weld to be tested can be rapidly obtained without performing a constant potential critical pitting temperature test on the weld to be tested, which can save more test time and test costs, and can accurately and comprehensively evaluate the pitting resistance of the stainless steel pipe weld to be tested. The method provided by the disclosure is of great value for accurately predicting the service life of stainless steel pipes, particularly the service life of the pipes used as marine industrial oil and gas pipes.

(2) In practical applications, the method provided by the disclosure can be used to determine the values of the standard critical pitting temperature of welds welded by different welding methods or different heat input welding methods, which can rapidly, accurately, and comprehensively evaluate the pitting resistance of welds welded by different welding methods or different heat input welding methods, and can evaluate the effects of different welding processes or different heat input welding methods on the pitting resistance of austenitic stainless steel welds with low cost. According to the evaluation result, a welding method with higher critical pitting temperature and better pitting resistance can be selected for batch welding to improve production efficiency.

(3) In the disclosure, the constant potential critical pitting temperature test is performed on the weld samples whose surface oxide inclusion density are obtained, the surface oxide inclusion density of each weld sample is taken as the independent variable, the critical pitting temperature of each weld sample is taken as the dependent variable, and the fitting function formula between the surface oxide inclusion density and the critical pitting temperature is obtained, which can accurately evaluate the pitting resistance of the stainless steel pipe weld to be tested with the same welding process, avoid the problem of inaccurate evaluation results caused by immersion test, without wasting more samples or test time, thereby a faster, more comprehensive, and more accurate evaluation of the pitting resistance of the stainless steel pipe weld to be tested is achieved, and the reliability of the critical pitting temperature evaluation is improved.

(4) The disclosure uses an optical microscope to observe the distribution of oxide inclusions in each weld sample, and uses software to calculate the surface oxide inclusion density of each weld sample, thereby the surface oxide inclusion density of each weld sample can be obtained, which can avoid the harm of inaccurate oxygen content measurement caused by low oxygen content.

DESCRIPTION OF THE EMBODIMENTS

Figure 1:
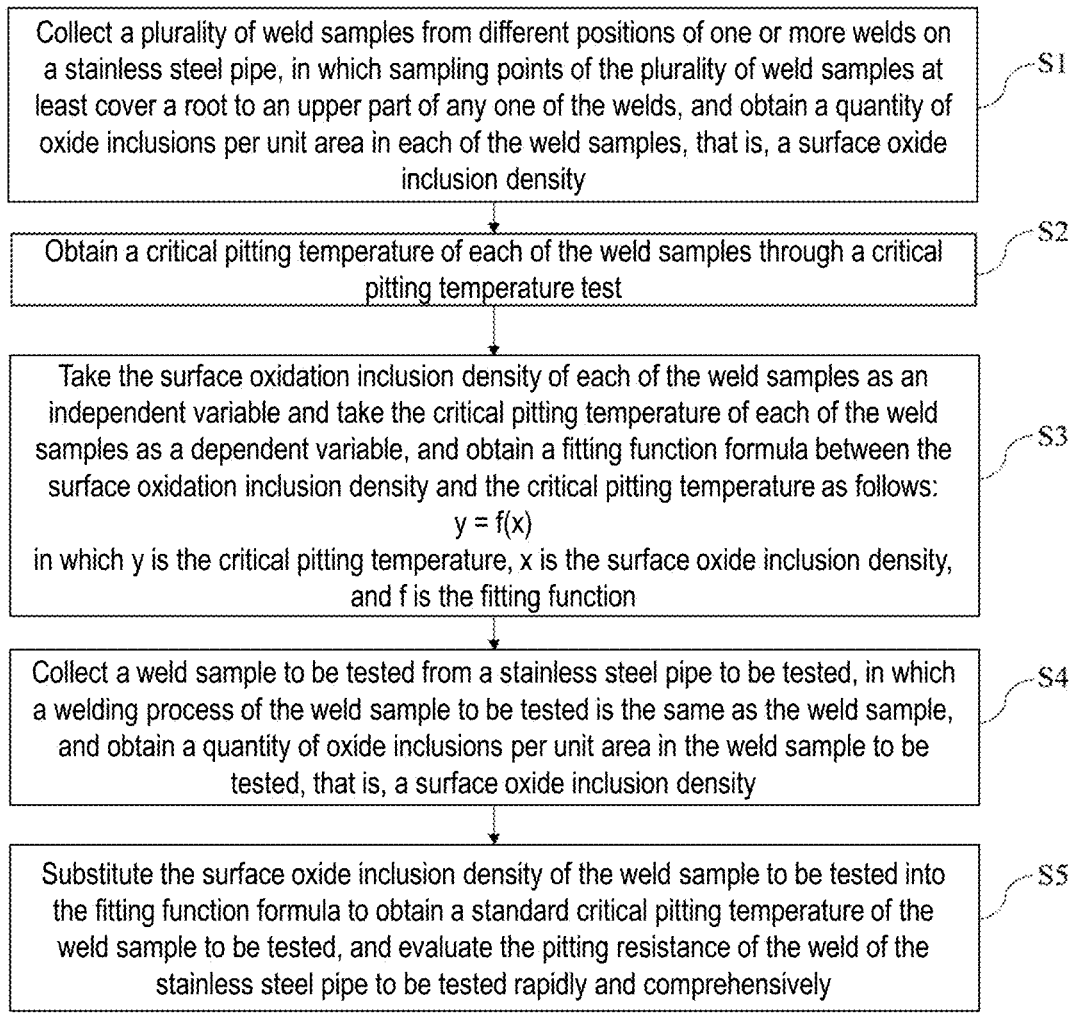
FIG. 1 is a flow chart of a rapid and comprehensive method for evaluating pitting resistance of stainless steel pipe welds provided by the disclosure.

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure.

The pitting resistance of austenitic stainless steel is complexly related to the austenite structure and ferrite structure in the stainless steel. Due to, for example, unqualified welding technology, inadequate weld protection, and incomplete slag removal after welding, the risk of occurring pitting corrosion of austenitic stainless steel welds is greatly increased, which affects the pitting resistance of the austenitic stainless steel welds. Due to inadequate welding protection and other reasons, the pitting resistance of austenitic stainless steel can vary greatly. How to rapidly and comprehensively evaluate the pitting resistance of the austenitic stainless steel pipe welds, evaluate the effects of different welding processes or different heat input welding methods on the pitting resistance of the austenitic stainless steel welds with low cost, and accurately predict the service life of austenitic stainless steel are issues that urgently need to be addressed. Based on above, the disclosure provides a rapid and comprehensive method for evaluating pitting resistance of stainless steel pipe welds, including the following steps:

S1. Multiple weld samples are collected from different positions of one or more welds on the stainless steel pipe, in which the sampling points of the multiple weld samples at least cover the root to the upper part of any weld, and the quantity of oxide inclusions per unit area in each weld sample is obtained, that is, the surface oxide inclusion density.

S2. The critical pitting temperature of each weld sample is obtained through a critical pitting temperature test.

S3. The surface oxidation inclusion density of each weld sample is taken as the independent variable, the critical pitting temperature of each weld sample is taken as the dependent variable, and the fitting function formula between the surface oxidation inclusion density and the critical pitting temperature is obtained as follows:

$$y=f(x)$$

In the formula, y is the critical pitting temperature, x is the surface oxide inclusion density, and f is the fitting function.

S4. A weld sample to be tested is collected from the stainless steel pipe to be tested, in which the welding process of the weld sample to be tested is the same as the weld sample, and the quantity of oxide inclusions per unit area in the weld sample to be tested is obtained, that is, the surface oxide inclusion density.

S5. The surface oxide inclusion density of the weld sample to be tested is substituted into the fitting function formula to obtain the standard critical pitting temperature of the weld sample to be tested, and the pitting resistance of the weld of the stainless steel pipe to be tested can be rapidly and comprehensively evaluated.

It should be noted that the disclosure does not limit the type of the above-mentioned stainless steel, and any stainless steel in the related art may be used. In some embodiments, the stainless steel may be, but is not limited to, austenitic stainless steel, ferritic stainless steel, martensitic stainless steel, duplex stainless steel, and age-hardening stainless steel.

In some embodiments, in Step S1, the specific operation of obtaining the multiple weld samples is: The multiple weld samples are collected from different positions of one or more welds on the stainless steel pipe. The sampling points of the weld samples at least cover the root to the upper part of any of the welds (including the root of the weld, the middle part of the weld, the upper part of the weld, the root of the heat affected zone, the middle part of the heat affected zone, and the upper part of the heat affected zone), and the purpose is to make the surface oxide inclusion density of the weld samples obtained subsequently more comprehensive and accurate, so as to accurately evaluate the pitting resistance of the weld, and to improve the reliability of the critical pitting temperature evaluation. It should be noted that when collecting the weld samples from multiple welds of the stainless steel pipe, the welding processes of different welds are the same.

In some embodiments, in Step S1, the quantity of the plurality of weld samples is ≥5.

In a preferred embodiment, in Step S1, the quantity of the plurality of weld samples is ≥8.

In some embodiments, the size of the weld sample is 10×10×B mm, in which B≥5.

In a preferred embodiment, the size of the weld sample is 10×10×B mm, in which B is 5 to 15.

Persons skilled in the art can adopt different methods to obtain the quantity of oxide inclusions per unit area in each weld sample in the stainless steel pipe, that is, the surface oxide inclusion density. In some embodiments, in Step S1, an optical microscope is used to observe the oxide inclusions on the surface of each weld sample, and a distribution image of the oxide inclusions is obtained. Then, the surface oxidation inclusion density of each weld sample is obtained by using software such as Image-pro plus, Image J, Fiji.

In some embodiments, in Step S1, before obtaining the quantity of oxide inclusions per unit area in each weld sample, electrolytic polishing is performed first, and the purpose is to reveal insoluble oxide inclusions and obtain a clear distribution image of the oxide inclusions.

In some embodiments, in Step S2, the critical pitting temperature test is a constant potential critical pitting temperature test.

In some embodiments, in Step S2, before the constant potential critical pitting temperature test is performed, the weld sample is pretreated first. In a preferred embodiment, the pretreatment includes the following steps: the weld sample is sanded and immersed in an acetone solution, then rinsed with an alcohol solution and dried.

In some embodiments, in Step S2, the specific operation of the constant potential critical pitting temperature test is: (1) The sample, auxiliary electrode, and salt bridge are placed in the solution (the initial solution temperature should be cooled to no more than 3° C.), the sample is connected to the potentiostat and data recording device, and connected to a temperature measuring and temperature controlling device. (2) A set 0.7 $V_{SCE}$ anodic potential is applied to the sample for 60 s or longer, then the solution is heated at a controllable rate of 1° C./min. (3) The monitoring current and solution temperature are recorded throughout the process of the test. The critical pitting temperature (CPT) is defined as the temperature corresponding to when the current density reaches 100 $\mu A \times cm^{-2}$ and remained at the level for at least 60 s. In some embodiments, the test solution is selected from one or more of NaCl solution, $NaCl+Na_2SO_4$ solution, $NaCl+NaNO_3$ solution, and $NaCl+Na_2S_2O_3$ solution.

In some embodiments, the concentration of the test solution is 0.1 mol/L to 1.5 mol/L.

The disclosure does not limit the above analysis method, such as but not limited to linear regression analysis and polynomial regression analysis. In practical applications, the appropriate analysis method may be selected for analysis based on factors such as the sample size of the weld sample and the fitting effect of the mathematical model obtained from fitting by different analysis methods.

In some embodiments, in Step S3, the fitting function formula is as follows:

$$y=ax^2+bx+c$$

In the formula, y is the critical pitting temperature, x is the surface oxide inclusion density, and a, b, and c are fitting parameters.

The above technical solution is described in detail below together with specific embodiments.

Example 1

The welding material used for the pipe weld in this embodiment is 316L austenitic stainless steel welding wire, the welding method used is gas metal arc welding (GMAW), the welding gun shielding gas is 98% Ar+2% $CO^2$, and the inside of the pipe is filled with pure Ar for protection.

1) Samples are obtained from different positions of the austenitic stainless steel pipe weld, and the sampling interval should preferably be such that the samples can better cover all positions of the pipe weld, so that the surface oxide inclusion density of the weld samples obtained subsequently is more comprehensive, and the size of each weld sample is preferably 10×10×10 mm. In this embodiment, weld samples are collected from different positions of a pipe weld (including the root of the weld, the middle part of the weld, the upper part of the weld, the root of the heat affected zone, the middle part of the heat affected zone, and the upper part of the heat affected zone), in which two weld samples are collected from the middle part of the weld and the middle part of the heat affected zone, one weld sample is collected from other locations, and a total of eight weld samples are collected.

2) The weld samples obtained are pretreated, and the pretreatment steps are as follows: 240 to 1000 mesh sandpaper is adopted to sand the surface of the weld sample to remove surface burrs, then an acetone solution is adopted to immerse to remove surface oil, and finally an alcohol solution is adopted to rinse to obtain weld samples with clean surfaces.

Figure 2:
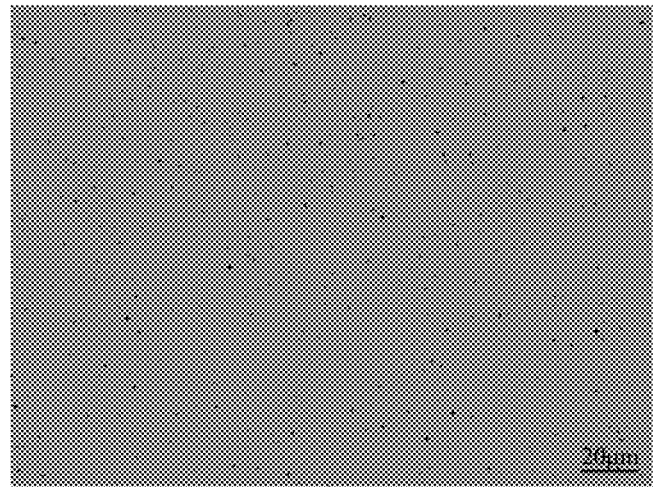
FIG. 2 is a schematic diagram of surface oxide inclusions of one of weld samples from an austenitic stainless steel pipe weld in Example 1.

3) After electrolytic polishing, the clean weld samples are observed for oxide inclusions under an optical microscope, and the surface oxide inclusion density is obtained using software such as Image-pro plus, Image J, and Fiji, in which the oxide inclusion density is the quantity of surface oxide inclusions per unit area of the weld sample. In this embodiment, the specific steps of the electrolytic polishing are: (1) the electrolyte is placed into the electrolytic polishing container and the rotation speed is set; (2) a 30V DC voltage is applied to the surface of the sample and the sample is placed in the electrolyte; (3) after electrolytic polishing for 10 s to 15 s, the current is turned off and the sample surface is cleaned. Then, the distribution of the surface oxide inclusion of each weld sample is observed under an optical microscope, an oxide inclusion image at 500× is obtained using the optical microscope, and the image is processed using Image-pro plus software. The specific operation is as follows: The Image-pro plus software is used to open the image, then reference lengths are selected and set sequentially, the calculation object is selected as the oxide inclusion, the calculation items are parameters such as area and diameter, the image area size and the quantity of oxide inclusions, and finally the surface oxidation inclusion density of the weld sample is obtained. FIG. 2 is a schematic diagram of surface oxide inclusions of one of the weld samples obtained from the austenitic stainless steel pipe weld in this embodiment.

4) The critical pitting temperature of each weld sample in the constant potential critical pitting temperature test is obtained. The constant potential critical pitting temperature test in this embodiment is carried out in accordance with the standard GB/T 32550-2016, and the specific operation is as follows: (1) The sample, auxiliary electrode, and salt bridge are placed in the solution (the initial solution temperature should be cooled to no more than 3° C.), the sample is connected to the potentiostat and data recording device, and connected to a temperature measuring and temperature controlling device. (2) A set 0.7 $V_{SCE}$ anodic potential is applied to the sample for 60 s or longer, then the solution is heated at a controllable rate of 1° C./min. (3) The monitoring current and solution temperature are recorded throughout the process of the test. In the operation, the test solution is preferably a NaCl solution with a concentration of 1 mol/L, and the critical pitting temperature (CPT) is the temperature corresponding to when the current density reaches 100 $\mu A \times cm^{-2}$ and remained for at least 60 s.

Figure 3:
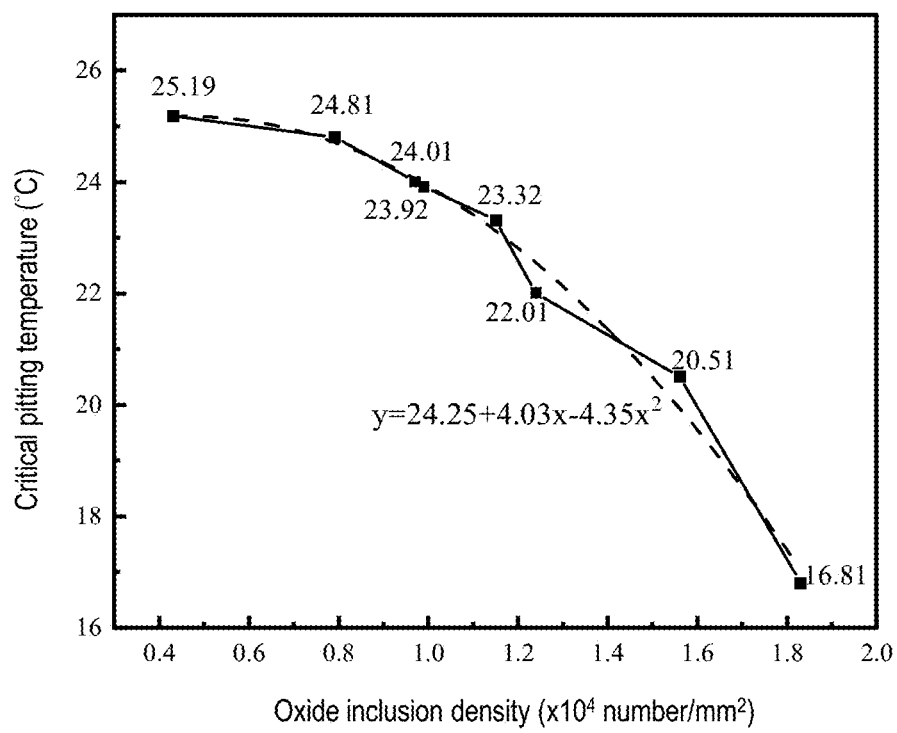
FIG. 3 is a schematic diagram of a fitting curve of critical pitting temperature-surface oxidation inclusion density of the austenitic stainless steel pipe weld in Example 1.

The critical pitting temperature of each weld sample in this embodiment is shown in FIG. 3, in which the critical pitting temperature of the weld with a surface oxide inclusion density of $1.83 \times 10^4$ number/mm$^2$ is 16.81° C., the critical pitting temperature of the weld with a surface oxide inclusion density of $1.56 \times 10^4$ number/mm$^2$ is 20.51° C., the critical pitting temperature of the weld with a surface oxide inclusion density of $1.24 \times 10^4$ number/mm$^2$ is 22.01° C., the critical pitting temperature of the weld with a surface oxide inclusion density of $1.15 \times 10^4$ number/mm$^2$ is 23.32° C., the critical pitting temperature of the weld with a surface oxide inclusion density of $0.99 \times 10^4$ number/mm$^2$ is 23.92° C., the critical pitting temperature of the weld with a surface oxide inclusion density of $0.97 \times 10^4$ number/mm$^2$ is 24.01° C., the critical pitting temperature of the weld with a surface oxidation inclusion density of $0.79 \times 10^4$ number/mm$^2$ is 24.81° C., and the critical pitting temperature of the weld with a surface oxidation inclusion density of $0.43 \times 10^4$ number/mm$^2$ is 25.19° C.

5) Fitting is performed on the critical pitting temperature of the weld samples with the surface oxide inclusion density, mathematical fitting software may be adopted, function formulas can be fitted by using Mathematica, Maple, or Origin, or any other software that can realize curve fitting may be used for fitting. In this embodiment, polynomial regression analysis fitting is performed on the critical pitting temperature with the oxide inclusion density obtained by the Origin software. Specifically, the surface oxide inclusion density of each weld sample is taken as the independent variable, the critical pitting temperature of each weld sample is taken as the dependent variable, the above data is input into the Origin software, the data is selected in the data table, then Analysis is clicked on the Origin menu bar, Polynomial Fitting in the Fitting option is selected, and polynomial fitting analysis is performed. Finally, the fitting function formula between the surface oxide inclusion density and the critical pitting temperature is obtained, as shown by the dotted line in FIG. 3, in which the fitting function formula between the critical pitting temperature (y) of the pipe weld and the surface oxide inclusion density (x) of the weld sample is as follows:

$$y = 24.25 + 4.03x - 4.35x^2 \quad (1)$$

In the formula, y is the critical pitting temperature of the austenitic stainless steel pipe weld, in ° C.; and x is the surface oxide inclusion density of the weld sample, in ×10$^4$ number/mm$^2$.

6) The weld to be tested are collected from the austenitic stainless steel pipe to be tested, the surface oxide inclusion density of the weld to be tested is obtained and substituted into the fitting function formula to obtain the standard critical pitting temperature of the weld to be tested, thereby the pitting resistance of the weld of the austenitic stainless steel pipe to be tested can be rapidly and comprehensively evaluated, and the service life of the austenitic stainless steel pipe to be tested can be predicted.

Example 2

The welding material used for the pipe weld in this embodiment is 316L austenitic stainless steel welding wire, the welding method used is gas metal arc welding (GMAW), the welding gun shielding gas is 98% Ar+2% $CO^2$, and no gas is filled inside the pipe.

1) Samples are obtained from different positions of the austenitic stainless steel pipe weld, and the sampling interval should preferably be such that the samples can better cover all positions of the pipe weld, so that the surface oxide inclusion density of the weld samples obtained subsequently is more comprehensive, and the size of each weld sample is preferably 10×10×10 mm. In this embodiment, weld samples are collected from different positions of a pipe weld (including the root of the weld, the middle part of the weld, the upper part of the weld, the root of the heat affected zone, the middle part of the heat affected zone, and the upper part of the heat affected zone), in which two weld samples are collected from the middle part of the weld and the middle part of the heat affected zone, one weld sample is collected from other locations, and a total of eight weld samples are collected.

2) The weld samples obtained are pretreated, and the pretreatment steps are as follows: 240 to 1000 mesh sandpaper is adopted to sand the surface of the weld sample to remove surface burrs, then an acetone solution is adopted to immerse to remove surface oil, and finally an alcohol solution is adopted to rinse to obtain weld samples with clean surfaces.

Figure 4:
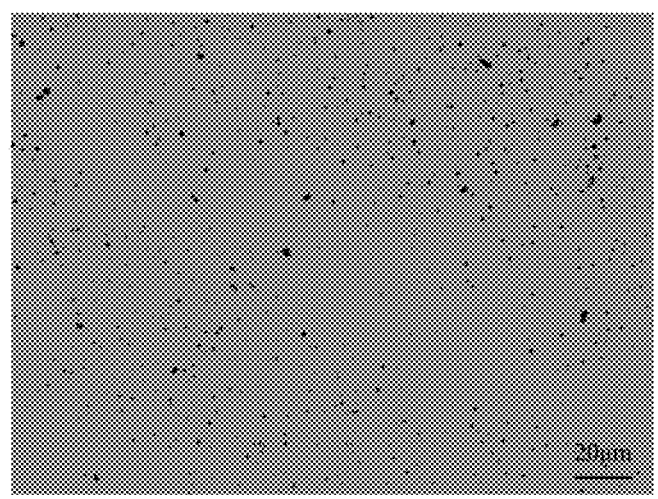
FIG. 4 is a schematic diagram of surface oxide inclusions of one of weld samples from an austenitic stainless steel pipe weld in Example 2.

3) After electrolytic polishing, the clean weld samples are observed for oxide inclusions under an optical microscope, and the surface oxide inclusion density is obtained using software such as Image-pro plus, Image J, and Fiji, in which the oxide inclusion density is the quantity of surface oxide inclusions per unit area of the weld sample. In this embodiment, the process of electrolytic polishing each weld sample and the operation steps of obtaining the surface oxide inclusion density of each weld sample are the same as in Example 1. FIG. 4 is a schematic diagram of oxide inclusions in one of the weld samples obtained from the austenite pipe weld in this embodiment.

4) The critical pitting temperature of each weld sample in the constant potential critical pitting temperature test is obtained. The constant potential critical pitting temperature test in this embodiment is carried out in accordance with the standard GB/T 32550-2016, and the specific operation is as follows: (1) The sample, auxiliary electrode, and salt bridge are placed in the solution (the initial solution temperature should be cooled to no more than 3° C.), the sample is connected to the potentiostat and data recording device, and connected to a temperature measuring and temperature controlling device. (2) A set 0.7 $V_{SCE}$ anodic potential is applied to the sample for 60 s or longer, then the solution is heated at a controllable rate of 1° C./min. (3) The monitoring current and solution temperature are recorded throughout the process of the test. In the operation, the test solution is preferably a NaCl solution with a concentration of 1 mol/L, and the critical pitting temperature (CPT) is the temperature corresponding to when the current density reaches 100 uA×cm$^{-2}$ and remained for at least 60 s.

Figure 5:
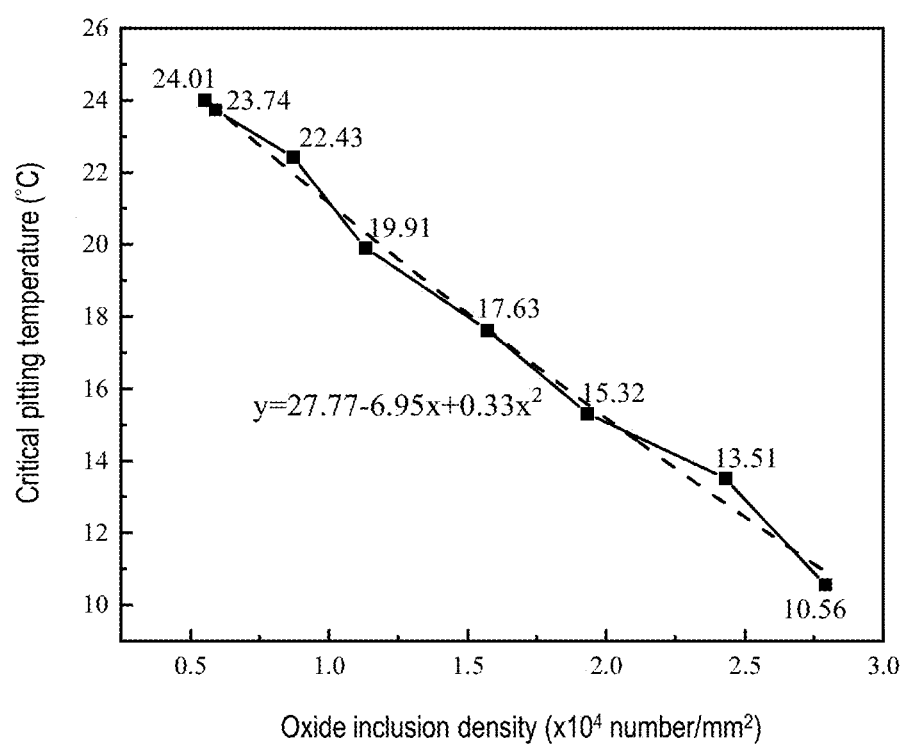
FIG. 5 is a schematic diagram of a fitting curve of critical pitting temperature-surface oxidation inclusion density of the austenitic stainless steel pipe weld in Example 2.

The critical pitting temperature of each weld sample in this embodiment is shown in FIG. 5, in which the critical pitting temperature of the weld with a surface oxide inclusion density of 2.79×10$^4$ number/mm$^2$ is 10.56° C., the critical pitting temperature of the weld with a surface oxide inclusion density of 2.43×10$^4$ number/mm$^2$ is 13.51° C., the critical pitting temperature of the weld with a surface oxide inclusion density of 1.93×10$^4$ number/mm$^2$ is 15.32° C., the critical pitting temperature of the weld with a surface oxide inclusion density of 1.57×10$^4$ number/mm$^2$ is 17.63° C., the critical pitting temperature of the weld with a surface oxide inclusion density of 1.13×10$^4$ number/mm$^2$ is 19.91° C., the critical pitting temperature of the weld with a surface oxide inclusion density of 0.87×10$^4$ number/mm$^2$ is 22.43° C., the critical pitting temperature of the weld with a surface oxidation inclusion density of 0.59×10$^4$ number/mm$^2$ is 23.74° C., and the critical pitting temperature of the weld with a surface oxidation inclusion density of 0.55×10$^4$ number/mm$^2$ is 24.01° C.

5) Fitting is performed on the critical pitting temperature of the weld samples with the surface oxide inclusion density, mathematical fitting software may be adopted, function formulas can be fitted by using Mathematica, Maple, or Origin, or any other software that can realize curve fitting may be used for fitting. In this embodiment, polynomial regression analysis fitting is performed on the critical pitting temperature with the oxide inclusion density obtained by the Origin software. Specifically, the surface oxide inclusion density of each weld sample is taken as the independent variable, the critical pitting temperature of each weld sample is taken as the dependent variable, the above data is input into the Origin software, the data is selected in the data table, then Analysis is clicked on the Origin menu bar, Polynomial Fitting in the Fitting option is selected, and polynomial fitting analysis is performed. Finally, the fitting function formula between the surface oxide inclusion density and the critical pitting temperature is obtained, as shown by the dotted line in FIG. 5, in which the fitting function formula between the critical pitting temperature (y) of the pipe weld and the surface oxide inclusion density (x) of the weld sample is as follows:

$$y=27.77-6.95x+0.33x^2 \qquad (2)$$

In the formula, y is the critical pitting temperature of the austenitic stainless steel pipe weld, in ° C.; and x is the surface oxide inclusion density of the weld sample, in ×10$^4$ number/mm$^2$.

6) The weld to be tested are collected from the austenitic stainless steel pipe to be tested, the surface oxide inclusion density of the weld to be tested is obtained and substituted into the fitting function formula to obtain the standard critical pitting temperature of the weld to be tested, thereby the pitting resistance of the weld of the austenitic stainless steel pipe to be tested can be rapidly and comprehensively evaluated, and the service life of the austenitic stainless steel pipe to be tested can be predicted.

Combining Example 1 and Example 2, it is found that the pitting resistance of the austenitic stainless steel weld with the same welding process is highly correlated with the content of oxide inclusions. The austenitic stainless steel with a higher oxide inclusion density has a lower critical pitting corrosion temperature and poorer pitting resistance. In addition, for austenitic stainless steel welds welded by the same process but with different heat inputs, the standard critical pitting temperature is calculated from the surface oxide inclusion density of the weld samples, the pitting resistance of the welds welded by different heat input methods is compared, and the welding heat input method with higher critical pitting temperature and better pitting resistance is selected for batch welding.

In the disclosure, multiple weld samples are collected from different positions of one or more welds on the stainless steel pipe, the sampling points of the multiple weld samples at least cover the root to the upper part of any weld, and the quantity of oxide inclusions per unit area in each weld sample is obtained, that is, the surface oxide inclusion density; through the critical pitting temperature test, the critical pitting temperature of each weld sample is obtained, and then the surface oxidation inclusion density of each weld sample is taken as the independent variable and the critical pitting temperature of each weld sample is taken as the dependent variable to obtain the fitting function formula between the surface oxidation inclusion density and the critical pitting temperature. The surface oxide inclusion density of the weld to be tested obtained by adopting the same welding process on the stainless steel pipe to be tested is substituted into the fitting function formula, and the standard critical pitting temperature of the weld to be tested can be rapidly obtained without performing a constant potential critical pitting temperature test on the weld to be tested, which can save more test time and test costs, and can accurately and comprehensively evaluate the pitting resistance of the stainless steel pipe weld to be tested. The method provided by the disclosure is of great value for accurately predicting the service life of stainless steel pipes, particularly the service life of the pipes used as marine industrial oil and gas pipes.

In practical applications, the method provided by the disclosure can accurately evaluate the pitting resistance of welds welded by different welding methods or different heat input welding methods through determining the values of the standard critical pitting temperature of welds welded by different welding methods or different heat input welding methods. Furthermore, a welding method with higher critical pitting temperature and better pitting resistance can be selected for batch welding to improve production efficiency.

In the disclosure, the constant potential critical pitting temperature test is performed on the weld samples whose surface oxide inclusion density are obtained, the surface oxide inclusion density of each weld sample is taken as the independent variable, the critical pitting temperature of each weld sample is taken as the dependent variable, and the fitting function formula between the surface oxide inclusion density and the critical pitting temperature is obtained, which can accurately evaluate the pitting resistance of the stainless steel pipe weld to be tested with the same welding process, avoid the problem of inaccurate evaluation results caused by immersion test, without wasting more samples or test time, thereby a faster, more comprehensive, and more accurate evaluation of the pitting resistance of the stainless steel pipe weld to be tested is achieved, and the reliability of the critical pitting temperature evaluation is improved.

It will be easily understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

What is claimed is:

1. A rapid and comprehensive method for evaluating pitting resistance of stainless steel pipe welds, comprising as follows:
   S1 collecting a plurality of weld samples from different positions of one or more welds on a stainless steel pipe, wherein sampling points of the plurality of weld samples at least cover a root to an upper part of any one of the welds, and obtaining a quantity of oxide inclusions per unit area in each of the weld samples, that is, a surface oxide inclusion density;
   S2 obtaining a critical pitting temperature of each of the weld samples through a critical pitting temperature test;
   S3 taking the surface oxidation inclusion density of each of the weld samples as an independent variable and taking the critical pitting temperature of each of the weld samples as a dependent variable, and obtaining a fitting function formula between the surface oxidation inclusion density and the critical pitting temperature as follows:

$$y=f(x)$$

wherein y is the critical pitting temperature, x is the surface oxide inclusion density, and f is a fitting function;
   S4 collecting a weld sample to be tested from a stainless steel pipe to be tested, wherein a welding process of the weld sample to be tested is same as the weld sample, and obtaining a quantity of oxide inclusions per unit area in the weld sample to be tested, that is, the surface oxide inclusion density;
   S5 substituting the surface oxide inclusion density of the weld sample to be tested into the fitting function formula to obtain a standard critical pitting temperature of the weld sample to be tested, and evaluating the pitting resistance of the weld of the stainless steel pipe to be tested.

2. The method according to claim 1, wherein in S1, a stainless steel of the stainless steel pipe comprises any one of austenitic stainless steel, ferritic stainless steel, martensitic stainless steel, duplex stainless steel, and age-hardening stainless steel.

3. The method according to claim 1, wherein in S1, a quantity of the plurality of weld samples is ≥5.

4. The method according to claim 3, wherein in S1, the quantity of the plurality of weld samples is ≥8.

5. The method according to claim 1, wherein in S1, a size of the weld sample is 10×10×B mm, wherein B≥5.

6. The method according to claim 1, wherein in S1, before obtaining the quantity of oxide inclusions per unit area in each of the weld samples, electrolytic polishing is performed.

7. The method according to claim 1, wherein in S2, the critical pitting temperature test is a constant potential critical pitting temperature test.

8. The method according to claim 7, wherein before the constant potential critical pitting temperature test is performed, a pretreatment is performed on the weld sample; and the pretreatment comprises as follows:
   sanding the weld sample and immersing in an acetone solution, rinsing with an alcohol solution, and then drying.

9. The method according to claim 1, wherein in S3, an analysis method of the fitting function formula comprises any one of linear regression analysis and polynomial regression analysis.

10. The method according to claim 9, wherein in S3, the fitting function formula is as follows:

$$y=ax^2+bx+c$$

wherein y is the critical pitting temperature, x is the surface oxide inclusion density, and a, b, and c are fitting parameters.

* * * * *